United States Patent
Taniguchi et al.

(10) Patent No.: US 10,260,921 B2
(45) Date of Patent: Apr. 16, 2019

(54) THERMAL FLOW METER

(71) Applicant: HITACHI AUTOMOTIVE SYSTEMS, LTD., Hitachinaka-shi, Ibaraki (JP)

(72) Inventors: Jiro Taniguchi, Hitachinaka (JP);
Keiichi Nakada, Hitachinaka (JP);
Yasuhiro Asano, Hirachinaka (JP);
Hiroshi Hirayama, Hitachinaka (JP);
Kazunori Suzuki, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 81 days.

(21) Appl. No.: 15/508,944

(22) PCT Filed: Jul. 24, 2015

(86) PCT No.: PCT/JP2015/071049
§ 371 (c)(1),
(2) Date: Mar. 6, 2017

(87) PCT Pub. No.: WO2016/051940
PCT Pub. Date: Apr. 7, 2016

(65) Prior Publication Data
US 2017/0276526 A1     Sep. 28, 2017

(30) Foreign Application Priority Data

Sep. 30, 2014   (JP) .................................. 2014-200866

(51) Int. Cl.
*G01F 1/684* (2006.01)
*H01R 13/405* (2006.01)
(Continued)

(52) U.S. Cl.
CPC ............ *G01F 1/6842* (2013.01); *G01F 1/684* (2013.01); *G01F 1/69* (2013.01); *G01F 15/18* (2013.01);
(Continued)

(58) Field of Classification Search
CPC .......... G01F 1/684; G01F 1/696; G01F 15/14; G01F 15/185
(Continued)

(56) References Cited

U.S. PATENT DOCUMENTS 7,712,361 B2 * 5/2010 Uramachi ............. G01F 15/185
                                                    73/204.22
8,234,931 B2    8/2012 Cheng et al.
(Continued)

FOREIGN PATENT DOCUMENTS

DE     102005038598 A1    2/2007
EP         2615429 A1    7/2013
(Continued)

OTHER PUBLICATIONS

Extended European Search Report dated Apr. 25, 2018 for the European Patent Application No. 15846835.5.
(Continued)

*Primary Examiner* — Daniel S Larkin
*Assistant Examiner* — Anthony W Megna Fuentes
(74) *Attorney, Agent, or Firm* — Volpe and Koenig, P.C.

(57) ABSTRACT

A connection terminal is on a flange of a thermal flow meter. A terminal connection part has a first and a second bent part. The first bent part is bent from a first direction to a second direction. The second bent part has is bent from the first bent part to a third direction. The first and second bent parts are formed such that when connection pin parts of a plurality of the connection terminals and terminal connection parts of the plurality of connection terminals are projected onto a
(Continued)

first imaginary plane, an imaginary line L extending along a first direction passing through the projection areas of each of the terminal connection parts of the plurality of connection terminals passes between the projection areas of the connection pin parts from among the connection pin parts of the plurality of connection terminals, that are positioned on both sides.

6 Claims, 18 Drawing Sheets

(51) Int. Cl.
  *H01R 12/72* (2011.01)
  *G01F 1/69* (2006.01)
  *G01F 15/18* (2006.01)
  *G01P 5/18* (2006.01)
  *G01F 5/00* (2006.01)
(52) U.S. Cl.
  CPC ......... *H01R 12/724* (2013.01); *H01R 13/405* (2013.01); *G01F 5/00* (2013.01); *G01P 5/18* (2013.01)
(58) Field of Classification Search
  USPC .............................................. 73/202–204.27
  See application file for complete search history.

(56) References Cited

U.S. PATENT DOCUMENTS

| | | | |
|---|---|---|---|
| 8,448,503 B2 | 5/2013 | Opitz et al. | |
| 8,511,158 B2* | 8/2013 | Kishikawa | G01F 1/6842 73/204.22 |
| 2003/0019289 A1* | 1/2003 | Ueyama | G01F 1/684 73/204.22 |
| 2003/0110854 A1* | 6/2003 | Nakada | F02D 41/187 73/204.22 |
| 2004/0069061 A1* | 4/2004 | Watanabe | G01F 1/6842 73/204.26 |
| 2006/0065049 A1* | 3/2006 | Nakada | G01F 1/6842 73/204.26 |
| 2007/0125169 A1* | 6/2007 | Nakano | G01F 1/6845 73/204.26 |
| 2010/0112867 A1* | 5/2010 | Berens | H01R 43/24 439/626 |
| 2011/0105012 A1 | 5/2011 | Niederhauser et al. | |
| 2013/0323978 A1 | 12/2013 | Ho | |
| 2014/0190270 A1* | 7/2014 | Suzuki | G01F 1/696 73/861.03 |

FOREIGN PATENT DOCUMENTS

| | | |
|---|---|---|
| JP | 06-011373 A | 1/1994 |
| JP | 06-109508 A | 4/1994 |
| JP | 2007-129880 A | 5/2007 |
| JP | 2010-525532 A | 7/2010 |
| JP | 2011-106868 A | 6/2011 |
| JP | 2013-064716 A | 4/2013 |
| NO | 20092466 A | 9/2009 |
| RU | 2010140907 A | 4/2012 |
| WO | 2012/080841 A1 | 6/2012 |

OTHER PUBLICATIONS

International Search Report, PCT/JP2015/071049, dated Nov. 10, 2015, 2 pgs.
Communication pursuant to Rule 114(2) dated Feb. 15, 2019 for the European Patent Application No. 15846835.5 (22 pages).
Communication pursuant to Rule 114(2) dated Feb. 15, 2019 for the European Patent Application No. 15846835.5 (75 pages).
Communication pursuant to Rule 114(2) dated Feb. 15, 2019 for the European Patent Application No. 15846835.5 (86 pages).
Communication pursuant to Rule 114(2) dated Jan. 18, 2019 for the European Patent Application No. 15846835.5 (4 pages).

* cited by examiner

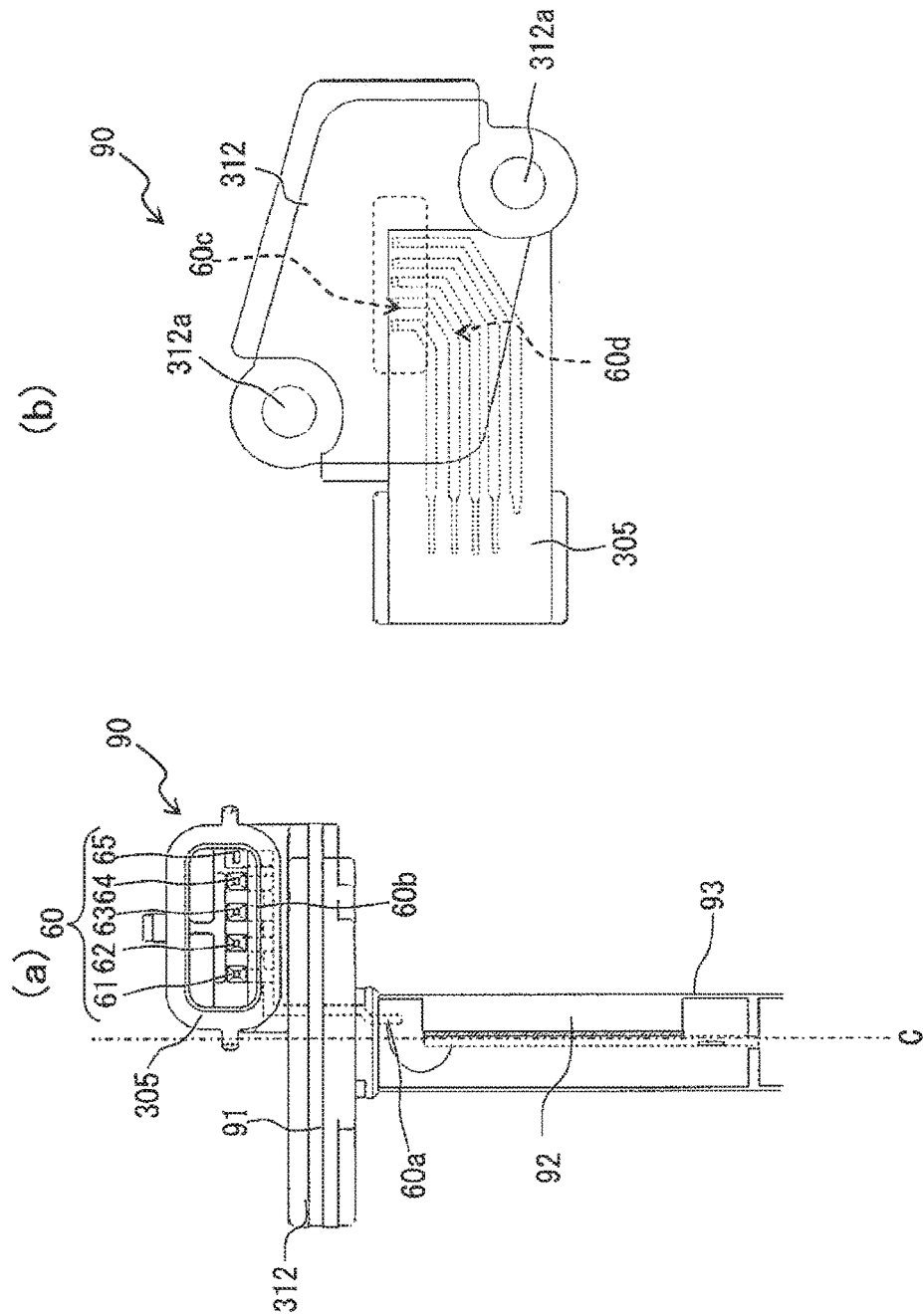

THERMAL FLOW METER

TECHNICAL FIELD

The present invention relates to a thermal flowmeter.

BACKGROUND ART

A thermal flowmeter is used to measure a flow amount of a gas and includes a flow measurement element which measures a flow amount. Here, the flow amount of the gas is measured in such a manner that heat is transmitted between the flow measurement element and the gas which is a measurement object. The flow amount which is measured by the thermal flowmeter is widely used as an important control parameter of various devices. The thermal flowmeter has a feature that a gas flow amount, for example, a mass flow amount can be measured with relatively high accuracy compared to other flowmeters.

However, there has been a desire to further improve measurement accuracy of a gas flow amount. For example, in a vehicle equipped with an internal combustion engine, there is an extremely high demand of saving fuel or purifying an exhaust gas. In order to handle these demands, an intake air amount which is an important parameter of the internal combustion engine needs to be measured with high accuracy.

A thermal flowmeter which measures an amount of intake air led to an internal combustion engine includes a sub-passage which takes a part of the intake air amount and a flow measurement element which is disposed in the sub-passage. Here, a state of a measurement object gas flowing in the sub-passage is measured by the transmission of heat between the flow measurement element and the measurement object gas and an electric signal indicating an amount of the intake air led to the internal combustion engine is output.

For example, as a technology of such a thermal flowmeter, PTL 1 discloses an "air flow measurement device including a flow sensor, a circuit chip which has a circuit controlling an input and an output of the flow sensor and provided therein, a sensor assembly which has a terminal electrically connected to the circuit chip, and a terminal pin which is electrically connected to the terminal to be electrically connected to the outside, in which the terminal pin is provided with a bent portion having at least one bent shape connected to at least an outside."

CITATION LIST

Patent Literature

PTL 1: JP 2011-106868 A

SUMMARY OF INVENTION

Technical Problem

Incidentally, a connection terminal which corresponds to the terminal pin of the thermal flowmeter of PTL 1 has a bent shape to be connected to the outside of the thermal flowmeter corresponding to the air flow measurement device. However, in a case where one bent shape is provided in the connection terminal (in the case of a so-called single bent shape), since the shape of the connection terminal is simple, a connection from a desired position to the outside of the thermal flowmeter using the connection terminal cannot be made and thus a limitation in design occurs.

Here, in a case where two or more bent shapes are provided in the connection terminal (in the case of a so-called double bent shape), a connection from a desired position in design to the outside of the thermal flowmeter through the connection terminal can be made. However, since the shape of such a connection terminal is complex, there is a concern that a strain may occur in a housing due to a thermal expansion difference between a metallic connection terminal and the resinous housing fixing the connection terminal in the thermal flowmeter when the thermal flowmeter is used. Accordingly, detection accuracy of the flow sensor (the flow measurement element) accommodated inside the housing is not stabilized.

The invention is made in view of such circumstances and an object of the invention is to provide a thermal flowmeter capable of connecting a connection terminal to an outside at a desired position and stabilizing detection accuracy of a flow measurement element.

Solution to Problem

In view of the above problem, a thermal flowmeter according to the invention is a thermal flowmeter which includes a sub-passage taking a part of a measurement object gas flowing in a main passage and a flow measurement element measuring a flow amount of the measurement object gas flowing in the sub-passage and measures a flow amount of the measurement object gas flowing in the main passage on the basis of a measurement value obtained by the flow measurement element. The thermal flowmeter includes a circuit board on which the flow measurement element is mounted, a housing which forms a part of the sub-passage and fixes the circuit board, and a plurality of connection terminals which are electrically connected to a plurality of board terminals of the circuit board at one end side and are connected to an outside of the thermal flowmeter at the other end side. The housing is provided with a flange which comes into contact with a pipe forming the main passage so that the thermal flowmeter is attached to the pipe. The plurality of connection terminals are arranged from one end side to the other end side so that a predetermined gap is opened between the adjacent connection terminals. Each of the connection terminals includes a terminal connection portion which is electrically connected to each of the board terminals at one end side, a connection pin portion which is connected to an outside of the thermal flowmeter at the other end side, a first bent portion which has a bent shape from the terminal connection portion to the connection pin portion, and a second bent portion which has a bent shape continuous to the first bent portion. The first bent portion and the second bent portion are disposed within the flange. The first bent portion has a bent shape from a first direction directed from the terminal connection portion toward the flange to a second direction intersecting the first direction. The second bent portion has a bent shape from the second direction to a third direction intersecting the first direction and the second direction and corresponding to the extension direction of the connection pin portion in a range from the first bent portion to the connection pin portion. The first bent portion and the second bent portion are formed so that a virtual line extending in the first direction and passing through a projection area of each of the terminal connection portions of the plurality of connection terminals passes between the projection areas of the connection pin portions located at both sides among the connection pin portions of the plurality of connection terminals when the connection pin portions of the plurality of connection terminals and the terminal connection portions of the plurality of connection terminals are projected onto a first virtual plane orthogonal to the third direction.

Advantageous Effects of Invention

According to the invention, it is possible to connect the connection terminal to the outside at a desired position and to stabilize the detection accuracy of the flow measurement element.

BRIEF DESCRIPTION OF DRAWINGS

FIG. 12(*a*) is a partially enlarged right side view of a thermal flowmeter according to a comparative example and FIG. 12(*b*) is a top view thereof.

DESCRIPTION OF EMBODIMENTS

Hereinafter, an embodiment of the invention will be described with reference to the drawings.

Figure 1:
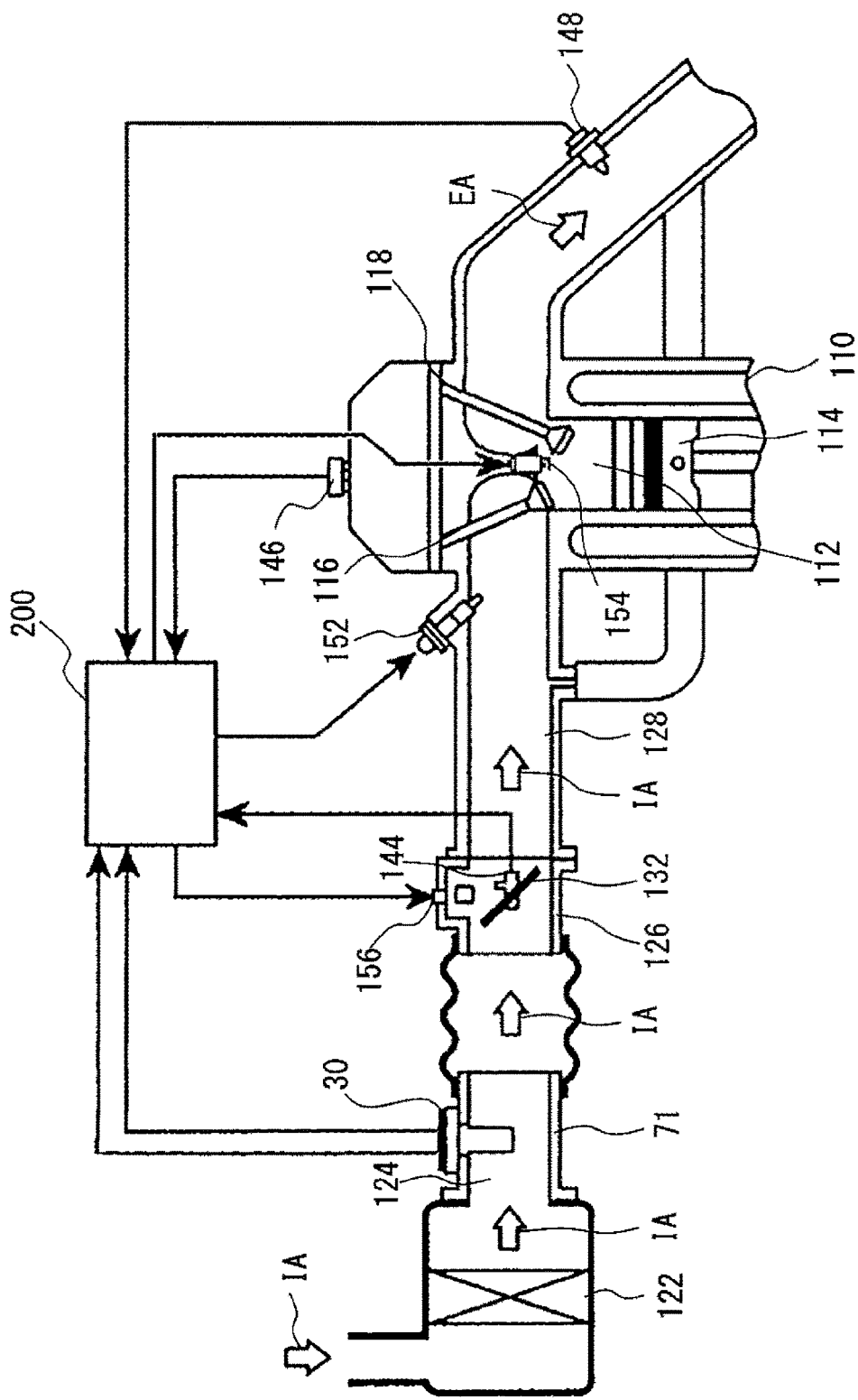
FIG. 1 is a system diagram illustrating an embodiment in which a thermal flowmeter according to the invention is used in an internal combustion engine control system.

1. Internal Combustion Engine Control System and Thermal Flowmeter Disposed Therein FIG. 1 is a system diagram illustrating an embodiment in which a thermal flowmeter according to the embodiment is used in an electronic fuel injection type internal combustion engine control system. As illustrated in FIG. 1, intake air which is a measurement object gas IA is suctioned from an air cleaner 122 and is led to a combustion chamber of an engine cylinder 112 through, for example, an intake body including an intake pipe 71 provided with a main passage 124, a throttle body 126, and an intake manifold 128 on the basis of an operation of an internal combustion engine 110 including the engine cylinder 112 and an engine piston 114.

A flow amount of the measurement object gas IA which is the intake air led to the combustion chamber is measured by a thermal flowmeter 30 according to the embodiment. Then, on the basis of the measured flow amount, fuel is supplied from a fuel injection valve 152 and is led to the combustion chamber along with the measurement object gas IA which is the intake air in a mixed gas state. Additionally, in the embodiment, the fuel injection valve 152 is provided at an intake port of the internal combustion engine. Here, the fuel injected to the intake port forms a mixed gas along with the measurement object gas IA which is the intake air and the mixed gas is led to the combustion chamber through the intake valve 116 so that the mixed gas is burned and mechanical energy is generated.

The thermal flowmeter 30 can be similarly used not only in a system that injects a fuel to the intake port of the internal combustion engine illustrated in FIG. 1 but also in a system in which a fuel is directly injected to each combustion chamber. Both systems have substantially the same basic concept in a control parameter measurement method including a method of using the thermal flowmeter 30 and an internal combustion engine control method including a fuel supply amount or an ignition timing. Then, as a representative example of both systems, a system that injects a fuel to the intake port is illustrated in FIG. 1.

The fuel and the air which are led to the combustion chamber are kept in a state in which the fuel and the air are mixed with each other and are burned to explode by a spark ignition of an ignition plug 154 so that mechanical energy is generated. The burned gas is led from an exhaust valve 118 to an exhaust pipe and is discharged as exhaust air EA from the exhaust pipe to the outside of a vehicle. A flow amount of the measurement object gas IA which is the intake air led to the combustion chamber is controlled by a throttle valve 132 an opening degree of which changes on the basis of an operation of an accelerator pedal. A fuel supply amount is controlled on the basis of the flow amount of the intake air led to the combustion chamber. Then, a driver can control the mechanical energy generated by the internal combustion engine by controlling the opening degree of the throttle valve 132 to control the flow amount of the intake air led to the combustion chamber.

A flow amount, a humidity, and a temperature of the measurement object gas IA which is the intake air taken from the air cleaner 122 and flowing through the main passage 124 are measured by the thermal flowmeter 30 and electric signals representing the flow amount, the humidity, and the temperature of the intake air are input from the thermal flowmeter 30 to a control device 200. Further, an output of a throttle angle sensor 144 that measures the opening degree of the throttle valve 132 is input to the control device 200. Furthermore, an output of a rotation angle sensor 146 is input to the control device 200 in order to measure a position or a state of the engine piston 114, the intake valve 116, or the exhaust valve 118 of the internal combustion engine and a rotation speed of the internal combustion engine. Moreover, an output of an oxygen sensor 148 is input to the control device 200 in order to measure a mixture ratio between a fuel amount and an air amount from the state of the exhaust air EA.

The control device 200 calculates a fuel injection amount or an ignition timing on the basis of the flow amount, the humidity, and the temperature of the intake air output from the thermal flowmeter 30 and the rotation speed of the internal combustion engine output from the rotation angle sensor 146. On the basis of these calculation results, the fuel supply amount of the fuel injection valve 152 and the ignition timing of the ignition plug 154 are controlled. In fact, the fuel supply amount or the ignition timing is controlled on the basis of an intake air temperature measured by the thermal flowmeter 30, a change in throttle angle, a change in engine rotation speed, and an air fuel ratio measured by the oxygen sensor 148. The control device 200 further controls an amount of air bypassing the throttle valve 132 through an idle air control valve 156 in an idle operation state of the internal combustion engine so that the rotation speed of the internal combustion engine in the idle operation state is controlled.

The fuel supply amount or the ignition timing which is a key control amount of the internal combustion engine is calculated by using the output of the thermal flowmeter 30 as main parameters. Thus, it is important to improve the measurement accuracy of the thermal flowmeter 30, to suppress a change in measurement accuracy with time, and to improve the reliability thereof in order to improve the vehicle control accuracy or ensure the reliability thereof. Particularly, in recent years, there has been an extremely high demand of saving fuel and purifying an exhaust gas in the vehicle. In order to handle these demands, it is important to improve the measurement accuracy of the flow amount of the measurement object gas IA which is the intake air measured by the thermal flowmeter 30.

2. Appearance of Thermal Flowmeter and Attachment State Thereof

FIG. 2 illustrates an appearance of the thermal flowmeter 30. FIG. 2A is a front view of the thermal flowmeter 30, FIG. 2B is a left side view, FIG. 2C is a rear view, and FIG. 2D is a right side view.

The thermal flowmeter 30 includes a housing 302, a front cover 303, and a rear cover 304. The housing 302 includes a flange 312 which fixes the thermal flowmeter 30 to the intake body constituting the main passage, an external connection portion (a connector) 305 which includes a plurality of external terminals (connection terminals) 60 electrically connected to an external device, and a measurement unit 310 which measures a flow amount or the like. A sub-passage groove which forms a sub-passage is formed inside the measurement unit 310.

When the front cover 303 and the rear cover 304 of the thermal flowmeter 30 are covered, a casing with a sub-passage is formed. A circuit package 400 which includes a flow measurement element 602 measuring a flow amount of the measurement object gas IA flowing in the main passage or a temperature detection unit 452 measuring a temperature of the measurement object gas IA flowing in the main passage is provided inside the measurement unit 310 (see FIGS. 3A and 3B).

Figure 2A:
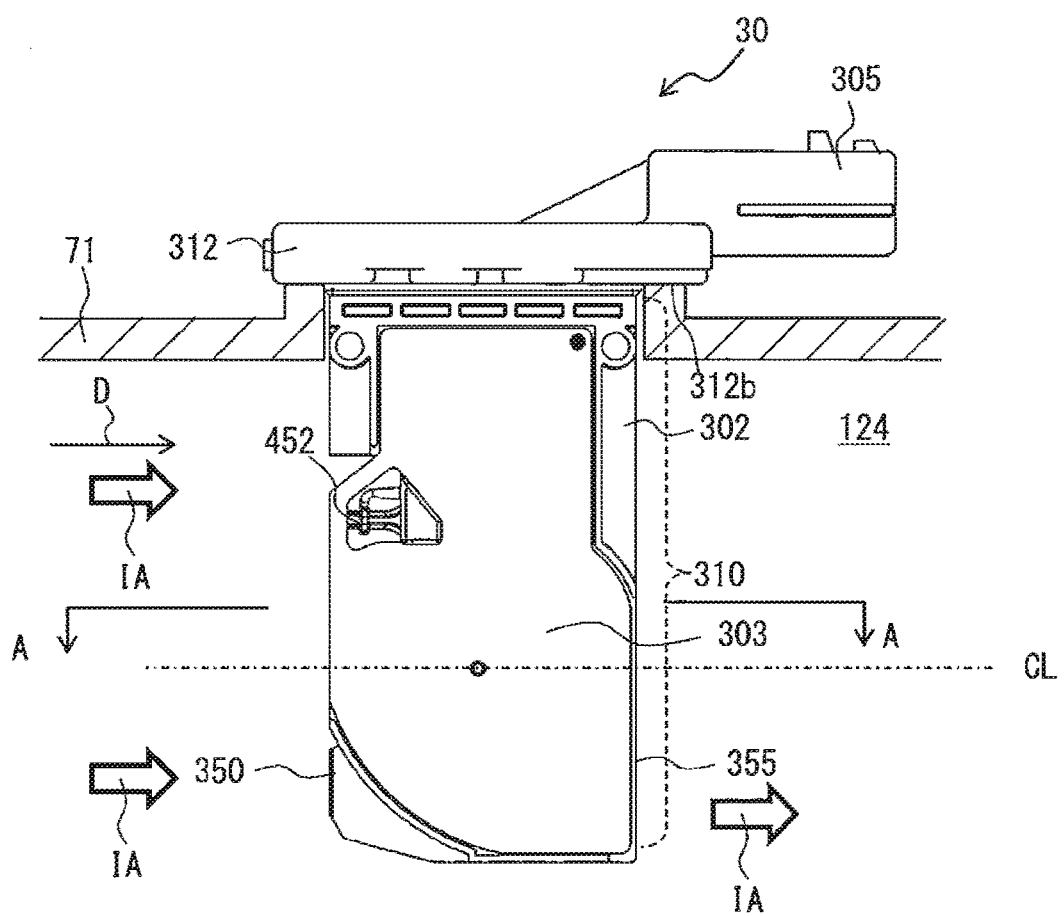
FIG. 2A is a front view illustrating an appearance of the thermal flowmeter according to an embodiment of the invention.
Figure 3A:
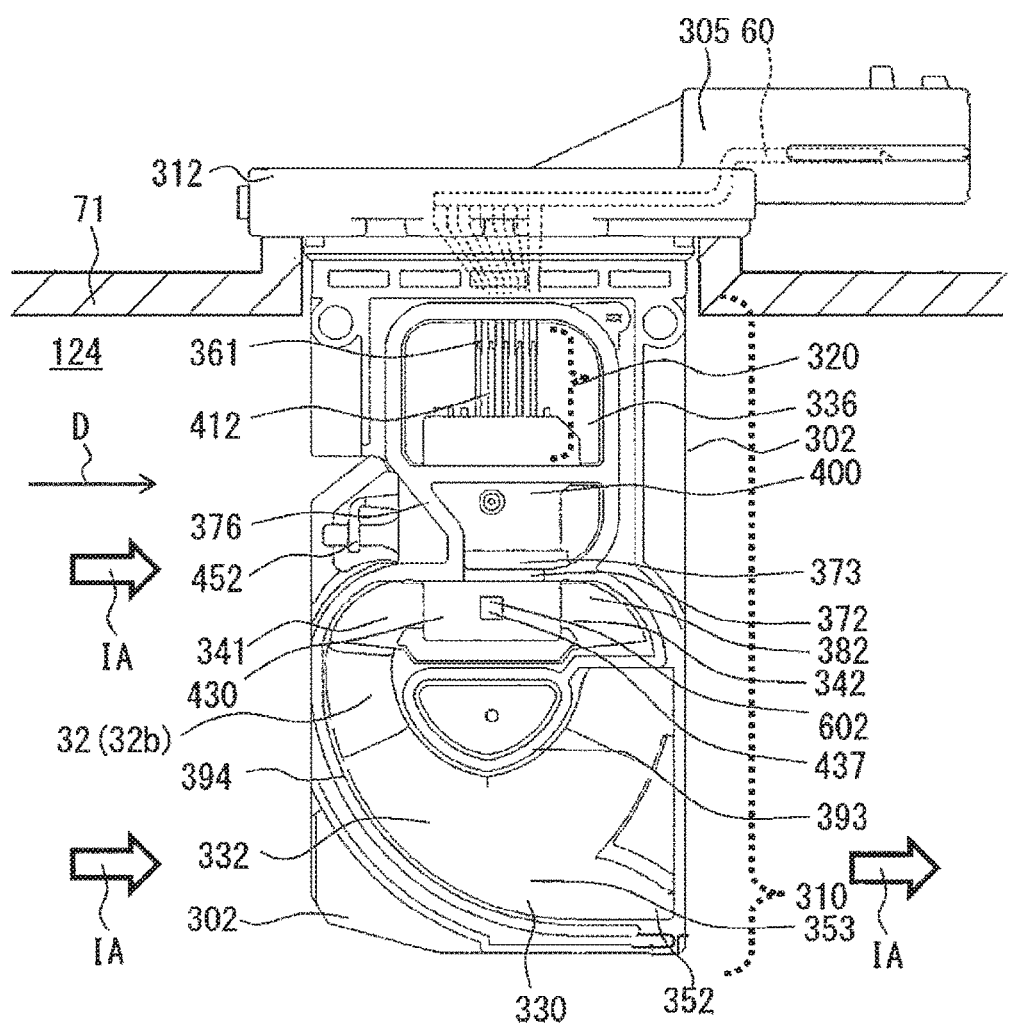
FIG. 3A is a front view illustrating a state of a housing in which a front cover is removed from the thermal flowmeter according to the embodiment of the invention.
Figure 3B:
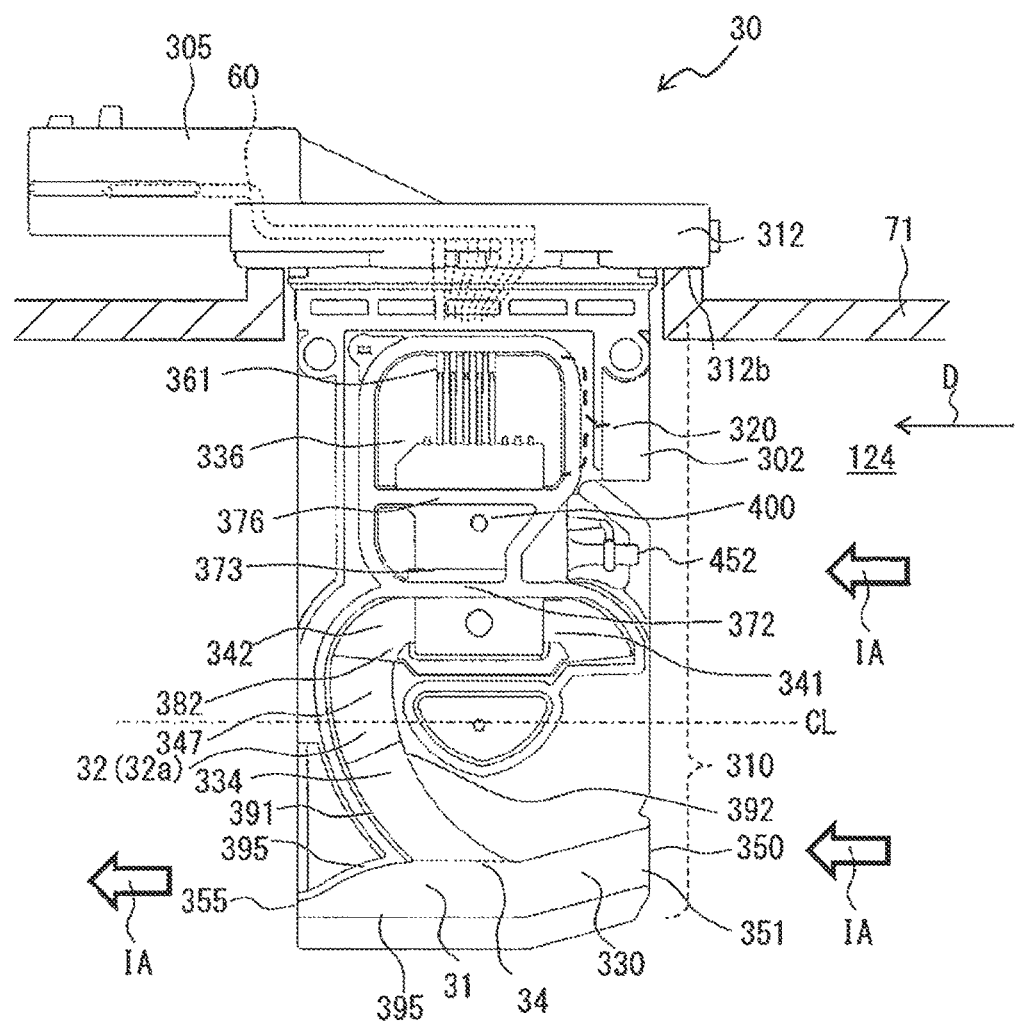
FIG. 3B is a rear view illustrating a state of a housing in which a rear cover is removed from the thermal flowmeter according to the embodiment of the invention.

In the thermal flowmeter 30, the measurement unit 310 is supported inside the main passage in a cantilevered manner while the flange 312 is fixed to the intake body (the intake pipe) 71. FIGS. 2A and 3B illustrate a part of the intake pipe 71 in order to clarify a positional relation between the thermal flowmeter 30 and the intake pipe 71.

The measurement unit 310 of the thermal flowmeter 30 is formed in a shape which extends from the flange 312 toward the center of the main passage 124 in the radial direction and a front end thereof is provided with a main intake opening 350 (see FIG. 2C) which takes a part of the measurement object gas IA which is the intake air into the sub-passage and a discharge opening 355 (see FIG. 2D) which returns the measurement object gas IA from the sub-passage to the main passage 124.

Since the main intake opening 350 of the thermal flowmeter 30 is provided at the front end side of the measurement unit 310 which extends from the flange 312 toward the center of the main passage 124 in the radial direction, a gas which is separated from an inner wall face of the main passage can be taken into the sub-passage. Accordingly, since it is possible to avoid an influence of a temperature of the inner wall face of the main passage, it is possible to suppress deterioration in measurement accuracy of the flow amount or the temperature of the gas. Further, as will be described later, in the embodiment, the center of the main intake opening 350 is offset with respect to a center line CL following a direction D in which the measurement object gas IA of the main passage 124 flows.

Further, since a fluid resistance is large in the vicinity of the inner wall face of the main passage 124, a flow rate decreases compared to an average flow rate of the main passage. In the thermal flowmeter 30 of the embodiment, since the main intake opening 350 is provided at the front end of the thin and elongated measurement unit 310 extending from the flange 312 toward the center of the main passage, it is possible to take a gas having a high flow rate at the center portion of the main passage into the sub-passage (the measurement passage). Further, since the discharge opening 355 of the sub-passage is also provided at the front end of the measurement unit 310, it is possible to return a gas flowing through the sub-passage to the vicinity of the center portion of the main passage 124 in which the flow rate is high.

Figure 2B:
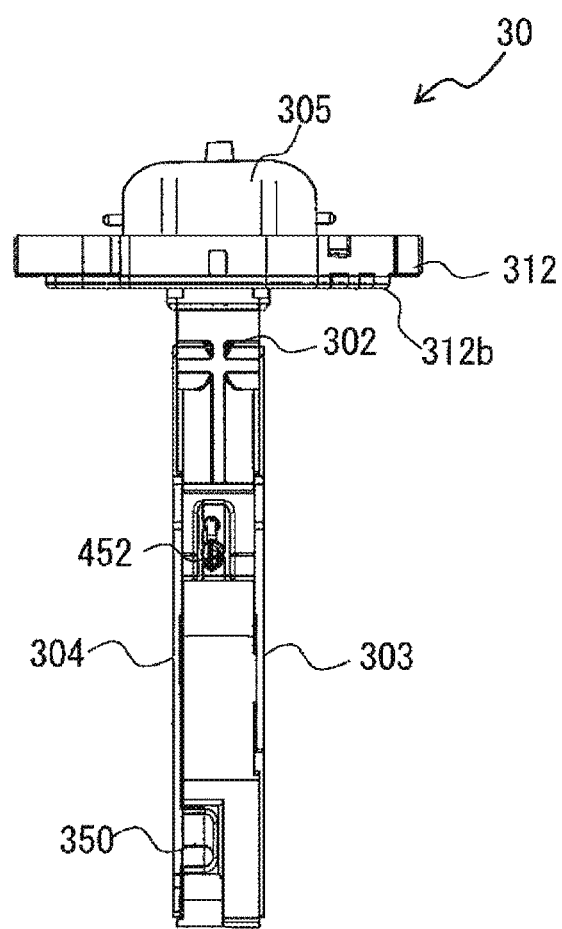
FIG. 2B is a left side view illustrating an appearance of the thermal flowmeter according to the embodiment of the invention.
Figure 2C:
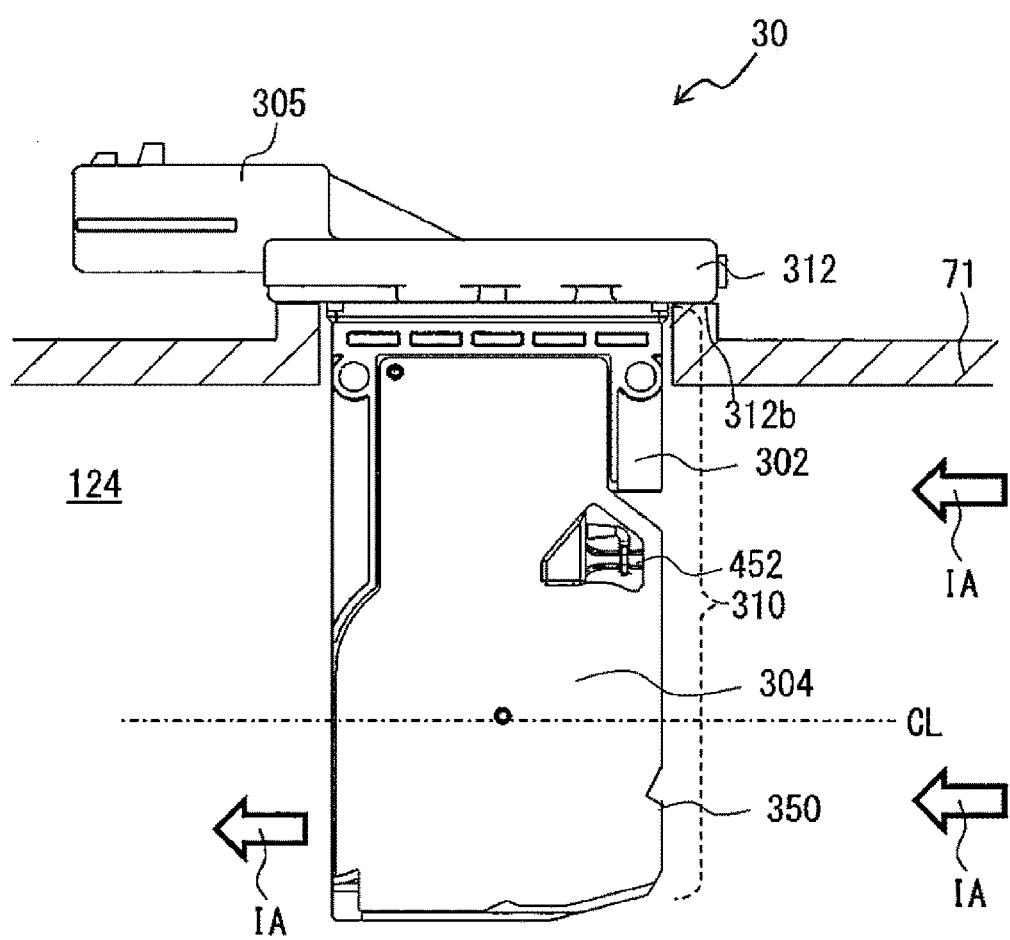
FIG. 2C is a rear view illustrating an appearance of the thermal flowmeter according to the embodiment of the invention.
Figure 2D:
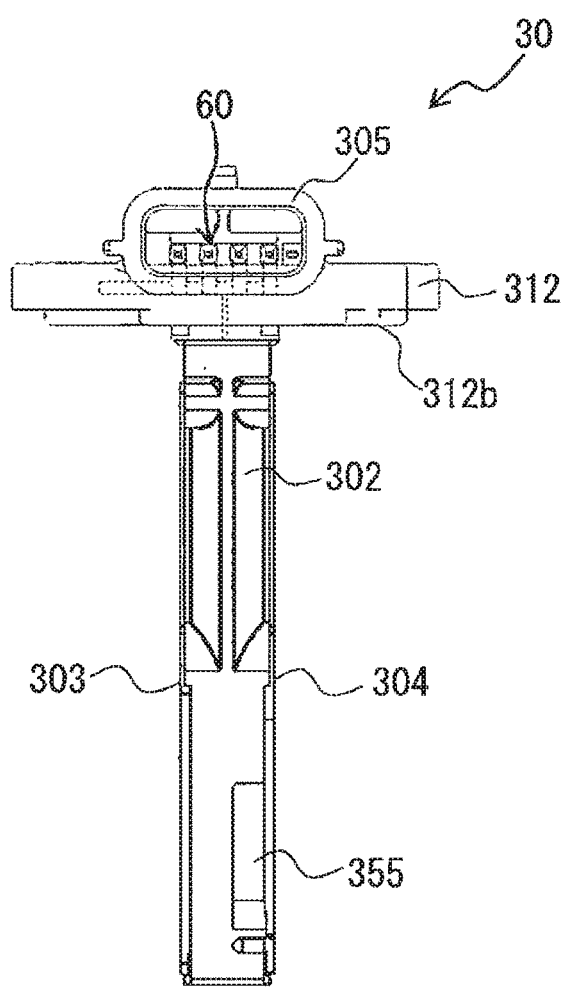
FIG. 2D is a right side view illustrating an appearance of the thermal flowmeter according to the embodiment of the invention.

The measurement unit 310 is formed in a shape which extends along an axis directed toward the center from the outer wall of the main passage 124, but a width thereof is formed in a narrow shape as illustrated in FIGS. 2B and 2D. That is, the measurement unit 310 of the thermal flowmeter 30 is formed in a shape in which a side face has a small width and a front face is substantially rectangular. Accordingly, the thermal flowmeter 30 can include a sub-passage which has a small fluid resistance with respect to the measurement object gas IA and has a sufficient length.

The temperature detection unit 452 which measures the temperature of the measurement object gas IA is provided at a position in which an upstream outer wall inside the measurement unit 310 is recessed toward the downstream side at the center portion of the measurement unit 310 so as to have a shape which protrudes toward the upstream side from the upstream outer wall.

Each of the front cover 303 and the rear cover 304 is formed in a thin plate shape with a wide cooling face. For this reason, since an air resistance in the thermal flowmeter 30 is decreased, there is an effect in which a cooling operation is easily performed by the measurement object gas flowing in the main passage 124.

A connection terminal 60 which includes an external terminal and a correction terminal is provided inside the external connection portion (the connector) 305 and the flange 312. The connection terminal 60 includes a terminal which outputs a flow amount and a temperature corresponding to a measurement result and a power terminal which supplies DC power. The correction terminal is a terminal which is used to store a correction value for the thermal flowmeter 30 in a memory inside the thermal flowmeter 30. A detailed description will be made below.

3. Sub-passage 330 and Circuit Package 400 inside Housing 302

Next, configurations of the sub-passage and the circuit package provided inside the housing 302 will be described with reference of FIGS. 3A and 3B. FIGS. 3A and 3B illustrate a state of the housing 302 in which the front cover 303 or the rear cover 304 is removed from the thermal flowmeter 30. FIG. 3A is a front view illustrating a state of a housing in which a front cover is removed from a thermal flowmeter according to a first embodiment of the invention and FIG. 3B is a rear view illustrating a state of a housing in which a rear cover is removed from the thermal flowmeter according to the first embodiment of the invention.

A sub-passage groove for molding a sub-passage at the front end side of the measurement unit 310 is provided in the housing 302. A sub-passage 330 is a passage which is formed inside the thermal flowmeter 30 to take a part of the measurement object gas flowing in the main passage 124. In the embodiment, sub-passage grooves 332 and 334 are provided at both front and rear faces of the housing 302. When the front and rear faces of the housing 302 are covered by the front cover 303 and the rear cover 304, the continuous sub-passage 330 is formed at both faces of the housing 302. With such a structure, both a front sub-passage groove 332 and a rear sub-passage groove 334 are formed in a part of the housing 302 and a penetration hole 382 penetrating the housing 302 is formed to connect both grooves by the use of dies which are formed at both faces of the housing 302 in a step (a resin molding step) of molding the housing 302 by a second resin (a thermoplastic resin). Accordingly, the flow measurement element 602 of the circuit package 400 can be disposed at the penetration hole 382.

As illustrated in FIG. 3B, a part of the measurement object gas IA which flows in the main passage is taken from the main intake opening 350 into the rear sub-passage groove 334 and flows in the rear sub-passage groove 334. When the rear sub-passage groove 334 is covered by the rear cover 304, a part of upstream sides of a first passage 31 and a second passage 32 in the sub-passage 330 are formed in the thermal flowmeter 30.

The first passage 31 is a pollutant material discharge passage which is formed from the main intake opening 350 taking the measurement object gas IA flowing in the main passage 124 to the discharge opening 355 discharging a part of the taken measurement object gas IA. The second passage 32 is a flow amount measurement passage which is formed from the sub-intake opening 34 taking the measurement object gas IA flowing in the first passage 31 toward the flow measurement element 602. The main intake opening 350 is opened to an upstream face of the main passage 124, the discharge opening 355 is opened to a downstream face of the main passage 124, and an opening area of the discharge opening 355 is smaller than an opening area of the main intake opening 350. Accordingly, the measurement object gas IA can also easily flow from the main intake opening 350 to the second passage 32.

In the rear face sub-passage groove 334, a passage groove of the second passage 32 (the passage to the flow measurement element 602) is formed in a shape which becomes deeper as it goes in a flow direction. Then, the measurement object gas IA gradually moves toward a front face as the measurement gas flows along the groove. The rear sub-passage groove 334 is provided with a steep inclined portion 347 which becomes steeply deeper at an upstream portion 342 of the circuit package 400. Apart of air having a small mass moves along the steep inclined portion 347 and flows toward a measurement flow passage face 430 illustrated in FIG. 4 at the upstream portion 342 in the penetration hole 382 of the circuit package 400. Meanwhile, since a path of a foreign material having a large mass cannot be abruptly changed due to a centrifugal force, the foreign material cannot flow along the steep inclined portion 347, but flows toward a measurement flow passage rear face 431 illustrated in FIG. 4. Subsequently, the air flows in the front sub-passage groove 332 illustrated in FIG. 3A through a downstream portion 341 in the penetration hole 382.

As described above, a portion including the measurement flow passage face 430 of the circuit package 400 is disposed inside a cavity of the penetration hole 382 and in the penetration hole 382, the rear sub-passage groove 334 and the front sub-passage groove 332 are connected to both left and right sides of the circuit package 400 with the measurement flow passage face 430.

As illustrated in FIG. 3A, the air which is the measurement object gas IA flows from the upstream portion 342 along the measurement flow passage face 430 in the penetration hole 382. At this time, the flow amount of the measurement object gas IA is measured by the transmission of heat of the flow measurement element 602 measuring the flow amount through a measurement front face (a heat transmission face) 437 which is provided at the flow measurement element 602 and is exposed into the second passage 32. Additionally, the flow amount measurement principle may be a general measurement principle of the thermal flowmeter. Here, a measurement configuration is not particularly limited as long as the flow amount of the measurement object gas flowing in the main passage can be measured on the basis of the measurement value measured by the flow measurement element 602 of the circuit package 400 as in the embodiment.

Both the measurement object gas IA having passed through the measurement flow passage face 430 and the air flowing from the downstream portion 341 of the circuit package 400 to the front sub-passage groove 332 flow along the front sub-passage groove 332 and are discharged from an exit groove 353 of the second passage 32 to the main passage 124 through the discharge opening facing the downstream face of the main passage 124.

In the embodiment, the second passage 32 which is formed by the rear sub-passage groove 334 is directed toward a flange direction from a front end of the housing 302 while depicting a curve and the measurement object gas IA flowing in the sub-passage 330 at a position closest to the flange becomes a flow opposite to the flow of the main passage 124. At the penetration hole 382 which becomes a part of the flow in the opposite direction, a sensor upstream passage 32a which is provided at the rear face side of the second passage 32 provided at one side of the housing 302 is connected to a sensor downstream passage 32b which is provided at the front face side of the second passage 32 provided at the other side thereof. The sensor upstream passage 32a is a passage which is bent in one direction toward the flow measurement element 602 so that the measurement object gas IA taken from the main passage 124 flows to the flow measurement element 602 and includes a part of the penetration hole 382 at the upstream side of the flow measurement element 602.

That is, in the embodiment, a front end side of the circuit package 400 is disposed inside a cavity of the penetration hole 382. A space of the upstream portion 342 located at the upstream side of the circuit package 400 and a space of the downstream portion 341 located at the downstream side of the circuit package 400 are included in the penetration hole 382 and as described above, the penetration hole 382 is drilled to penetrate the front and rear face sides of the housing 302. Accordingly, as described above, the sensor upstream passage 32a which is formed by the front sub-passage groove 332 at the front face side of the housing 302 communicates with the sensor downstream passage 32b which is formed by the rear sub-passage groove 334 at the rear face side at the penetration hole 382. The sensor downstream passage 32b is a passage which is bent in one direction toward the discharge opening 355 so that the measurement object gas IA having passed through the flow measurement element 602 flows to the discharge opening 355 and includes a part of the penetration hole 382 at the downstream side of the flow measurement element 602.

Figure 4:
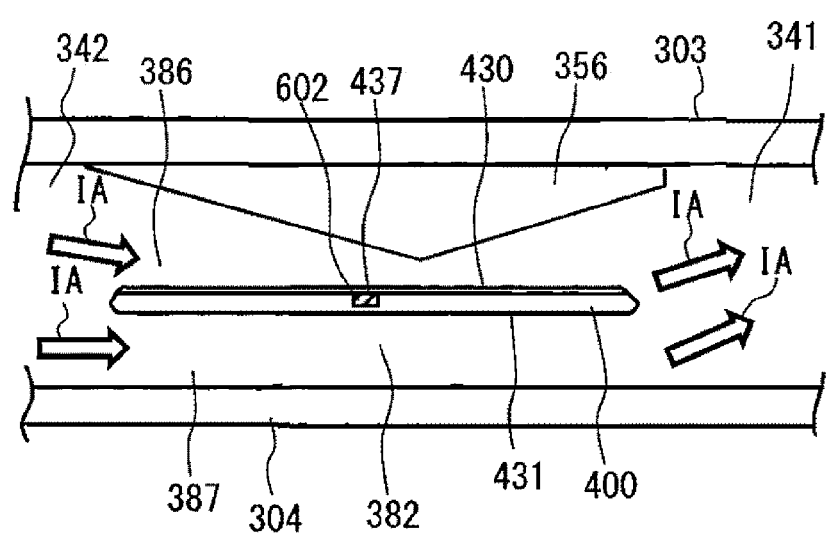
FIG. 4 is a cross-sectional view taken along a line A-A of FIG. 2A.

Further, as illustrated in FIG. 4, a space near the measurement flow passage face 430 and a space near the measurement flow passage rear face 431 are defined by the circuit package 400 inserted into the housing 302, but is not defined by the housing 302. One space which is formed by the space of the upstream portion 342, the space of the downstream portion 341, the space near the measurement flow passage face 430, and the space near the measurement flow passage rear face 431 is continuously formed at the front and rear faces of the housing 302 and the circuit package 400 which is inserted into the housing 302 protrudes to one space in a cantilevered manner. With such a configuration, it is possible to mold the sub-passage groove at both faces of the housing 302 by one resin molding step and to perform a molding operation in accordance with a structure of connecting the sub-passage grooves at both faces.

The circuit package 400 is fixed to be buried in the housing 302 by fixing portions 372, 373, and 376 of the housing 302 molded by the second resin. Such a fixing structure can be mounted on the thermal flowmeter 30 in such a manner that the housing 302 is molded by the second resin and the circuit package 400 is insert-molded in the housing 302. Additionally, in the embodiment, the first resin is a resin for molding the circuit package 400 and the second resin is a resin for molding the housing 302.

A front sub-passage inner peripheral wall (a second passage wall) 393 and a front sub-passage outer peripheral wall (a second passage wall) 394 are provided at both sides of the front sub-passage groove 332 and front ends of the front sub-passage inner peripheral wall 393 and the front sub-passage outer peripheral wall 394 in the height direction adhere to an inner face of the front cover 303 so that a part of the sensor downstream passage 32b of the housing 302 is formed.

The measurement object gas IA which is taken from the main intake opening 350 and flows in the first passage 31 formed by the rear sub-passage groove 334 flows from the right side to the left side in FIG. 3B. Here, a part of the taken measurement object gas IA flows to be distributed to the sub-intake opening 34 of the second passage 32 formed to be branched from the first passage 31. The flowing measurement object gas IA flows toward a flow passage 386 which is formed by a front face of the measurement flow passage face 430 of the circuit package 400 and a protrusion 356 provided in the front cover 303 through the upstream portion 342 of the penetration hole 382 (see FIG. 4).

The other measurement object gas IA flows toward a flow passage 387 which is formed by the measurement flow passage rear face 431 and the rear cover 304. Subsequently, the measurement object gas IA having passed through the flow passage 387 moves to the front sub-passage groove 332 through the downstream portion 341 of the penetration hole 382 and is merged with the measurement object gas IA flowing in the flow passage 386. The merged measurement object gas IA flows in the front sub-passage groove 332 and is discharged from the discharge opening 355 formed in the housing to the main passage 124 through an exit 352.

The sub-passage groove is formed so that the measurement object gas IA led from the rear sub-passage groove 334 to the flow passage 386 through the upstream portion 342 of the penetration hole 382 is bent more than the flow passage led to the flow passage 387. Accordingly, a material having a large mass such as a garbage included in the measurement object gas IA is accumulated in the flow passage 387 which is bent to a small degree.

The protrusion 356 in the flow passage 386 forms a diaphragm so that the measurement object gas IA becomes a laminar flow having a small vortex. Further, the protrusion 356 increases the flow rate of the measurement object gas IA. Accordingly, the measurement accuracy is improved. The protrusion 356 is formed at the front cover 303 which is a cover facing the measurement face exposure portion 436 of the flow measurement element 602 provided at the measurement flow passage face 430.

Here, as illustrated in FIG. 3B, the rear sub-passage groove 334 is formed by a first passage wall 395, a rear sub-passage inner peripheral wall (a second passage wall) 392, and a rear sub-passage outer peripheral wall (a second passage wall) 391 which are provided to face one another. When front ends of the rear sub-passage inner peripheral wall 392 and the rear sub-passage outer peripheral wall 391 in the height direction adhere to the inner face of the rear cover 304, a part of the sensor upstream passage 32a of the second passage 32 and the first passage 31 of the housing 302 are formed.

As illustrated in FIGS. 3A and 3B, a cavity portion 336 is formed between a portion provided with the sub-passage groove and the flange 312 in the housing 302. A terminal connection space 320 which connects a lead terminal 412 of the circuit package 400 and the connection terminal 60 of the external connection portion 305 is provided inside the cavity portion 336. The lead terminal 412 and the connection terminal 60 are electrically connected to each other by spot-welding or laser-welding.

4. Lead Terminal of Circuit Package 400

Figure 5A:
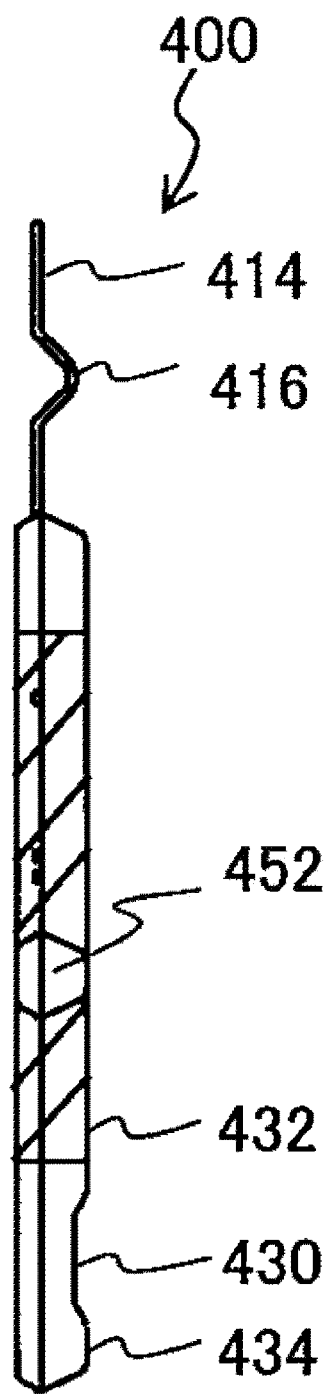
FIG. 5A is a left side view of a circuit package illustrated in FIG. 3A.
Figure 5B:
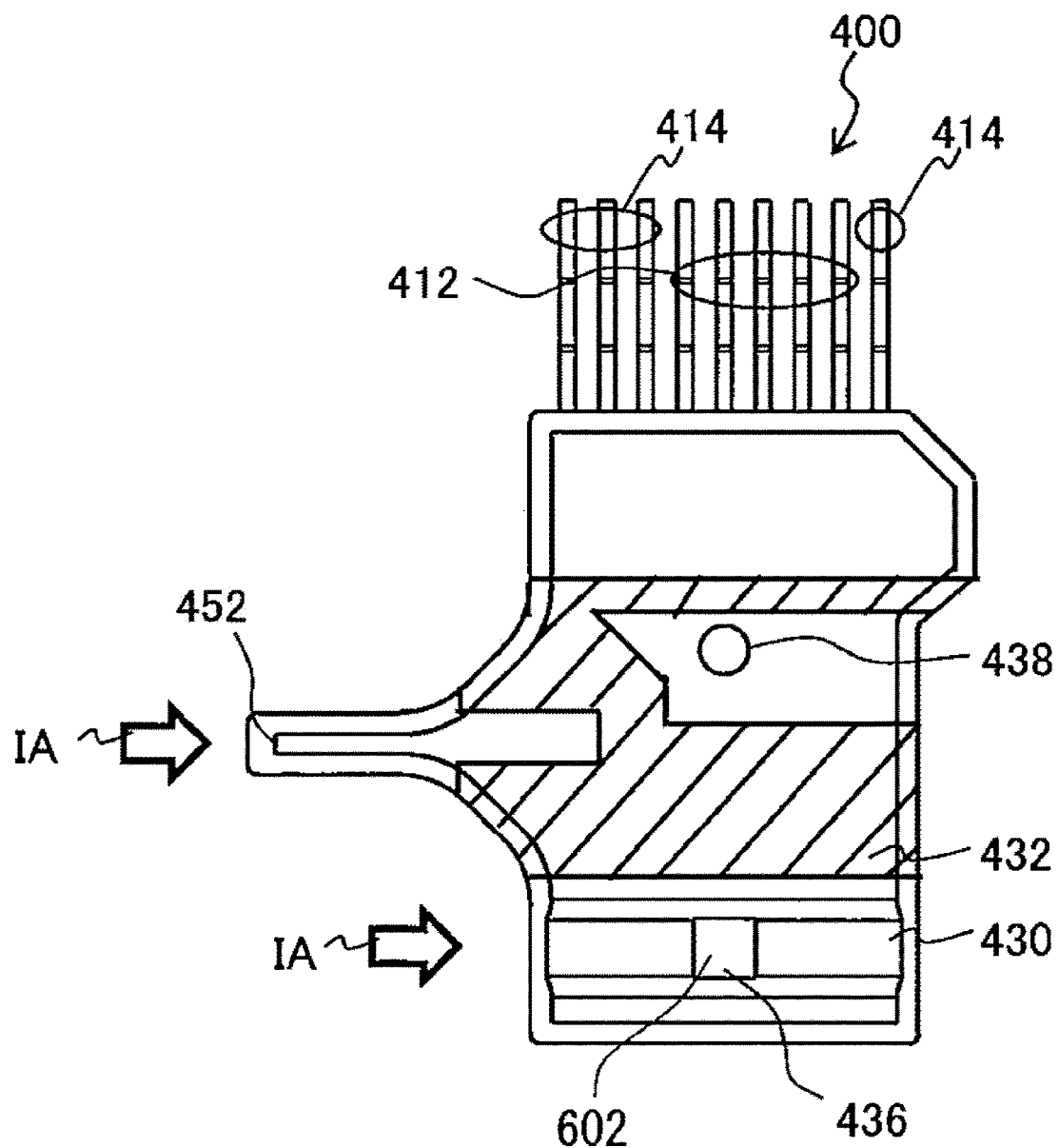
FIG. 5B is a front view of the circuit package illustrated in FIG. 3A.
Figure 5C:
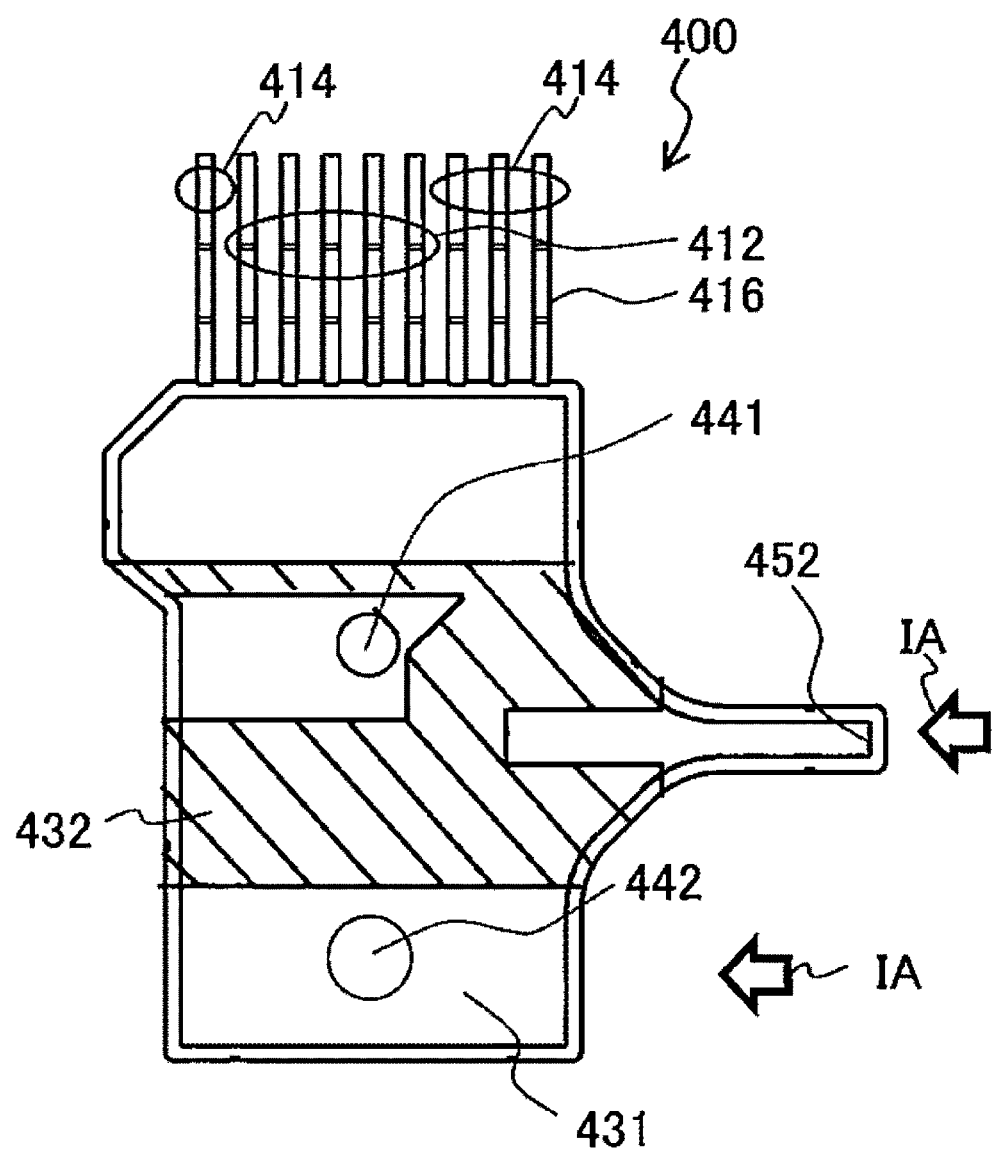
FIG. 5C is a rear view of the circuit package illustrated in FIG. 3A.

The circuit package (the circuit board) 400 is provided with a lead frame which is electrically connected to the flow measurement element 602 provided therein in order to supply power thereto and to output a flow amount measurement value or a temperature measurement value. The lead frame includes a plurality of lead terminals (board terminals) 412 which are exposed from the first resin to protrude from a sealing portion sealed by the first resin. The lead terminal 412 has a band plate shape which extends linearly at a uniform width and a plurality of lines are arranged in parallel on the same plane. As illustrated in FIGS. 5A to 5C, the lead frame is provided with the lead terminal 412 which is connected to the external connection terminal 60 and an inspection terminal 414 which inspects the circuit package 400. Here, these terminals are formed to be exposed from the first resin.

Figure 6:
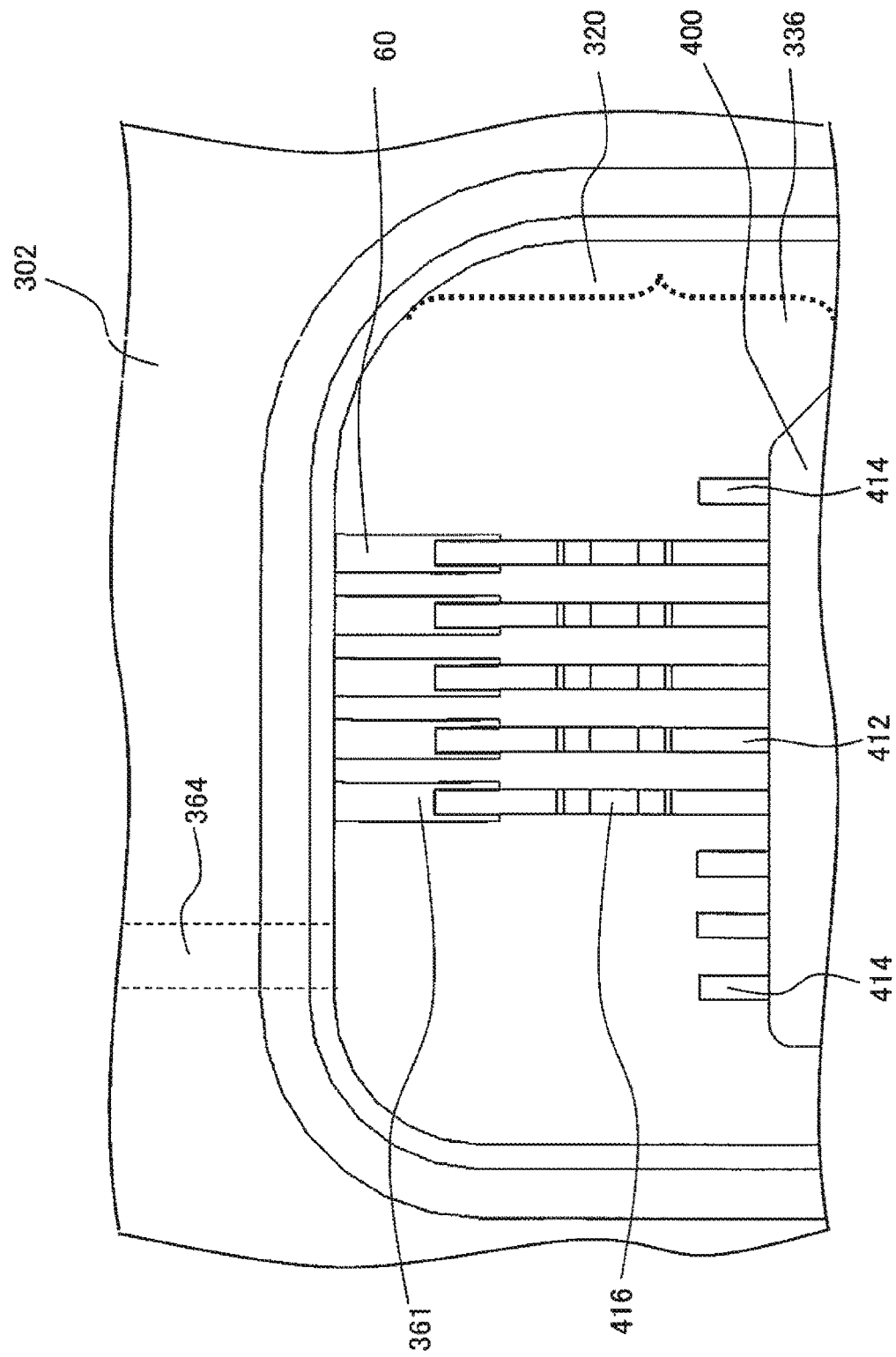
FIG. 6 is an enlarged view in the vicinity of a terminal connection space of FIG. 3A.

FIG. 6 is an enlarged view in the vicinity of the terminal connection space of FIG. 3A. Here, FIGS. 5A to 5C illustrate the inspection terminal 414 which has substantially the same length as that of the lead terminal 412, but the inspection terminal is not used as a measurement terminal after the operation of the circuit package 400 is checked (the inspection ends). Thus, as illustrated in FIG. 6, the inspection terminal 414 is disconnected (see FIG. 6). Thus, as illustrated in FIG. 6, the inspection terminal 414 is not connected to the connection terminal 60.

The connection terminal 60 is fixed to the housing 302 and an inner end 361 which protrudes toward the circuit package 400 is disposed to overlap the corresponding lead terminal 412. The inner end 361 protrudes from the flange 312 toward the circuit package 400 and extends in the same direction as that of the lead terminal 412. A plate thickness of the lead terminal 412 is formed to be thinner than a plate thickness of the inner end 361 of the connection terminal 60.

The lead terminal 412 and the inner end 361 of the connection terminal 60 are electrically connected and fixed to the terminal connection space 320 which is a gap portion molded between the circuit package 400 and the flange 312 through spot-welding or laser-welding. A connection portion between the lead terminal 412 and the inner end 361 is disposed at the inside of the main passage in relation to the intake pipe.

Here, the thermal flowmeter 30 is formed such that a base end side of the measurement unit 310 increases in temperature by the radiant heat of the internal combustion engine and a front end side thereof decreases in temperature due to the cooling of the intake air. Accordingly, a temperature difference occurs in a direction intersecting the intake air flow direction. Particularly, since the circuit package 400 is molded by the first resin (the thermosetting resin) and the housing 302 is molded by the second resin (the thermoplastic resin), a difference in thermal expansion coefficient occurs. For this reason, a stress easily acts on the lead terminal 412 due to a temperature difference.

Components like the housing 302, the circuit package 400, the lead terminal 412, and the connection terminal 60 have different thermal expansion coefficients and a deformation such as bending or twisting occurs in the entire thermal flowmeter 30 in addition to the expansion and the contraction in the axial direction. Thus, there is a possibility that a maximal main stress may be applied to a low-rigid portion such as a thin wire (a wire) or a thin plate (a lead) inside the circuit package 400 so that the portion is broken.

Particularly, the thermal flowmeter 30 becomes a high temperature state or a low temperature state as a whole or becomes partially cold due to the cooling effect of the intake air differently from components which are normally exposed to a high temperature. Accordingly, a difference in temperature alternately occurs in response to a portion and this phenomenon occurs frequently. In this way, since the thermal flowmeter is used in a severe environment in which components are frequently expanded and contracted due to heat, there is a need to reduce a stress caused by heat.

As a result, both ends of the lead terminal 412 are held and a distance between both ends changes due to a change in temperature (heat cycle) of the thermal flowmeter 30 in use. Particularly, since one end of the lead terminal 412 is held (bound) by the first resin of the circuit package 400 and the other end thereof is connected to the connection terminal 60 fixed to the housing 302, a distance between both ends of the lead terminal 412 easily changes due to a difference in thermal expansion coefficient of the material.

Here, the lead terminal 412 is provided with a stress absorption bent portion 416 which improves a mechanical elastic force. The stress absorption bent portion 416 is disposed between both fixing portions of the lead terminal 412 and the stress absorption bent portion 416 is formed to be bent in the lead thickness direction which is a direction intersecting a lead face of a flat plate-shaped lead frame body sealed by the first resin.

5. Structure of Connection Terminal

Figure 7:
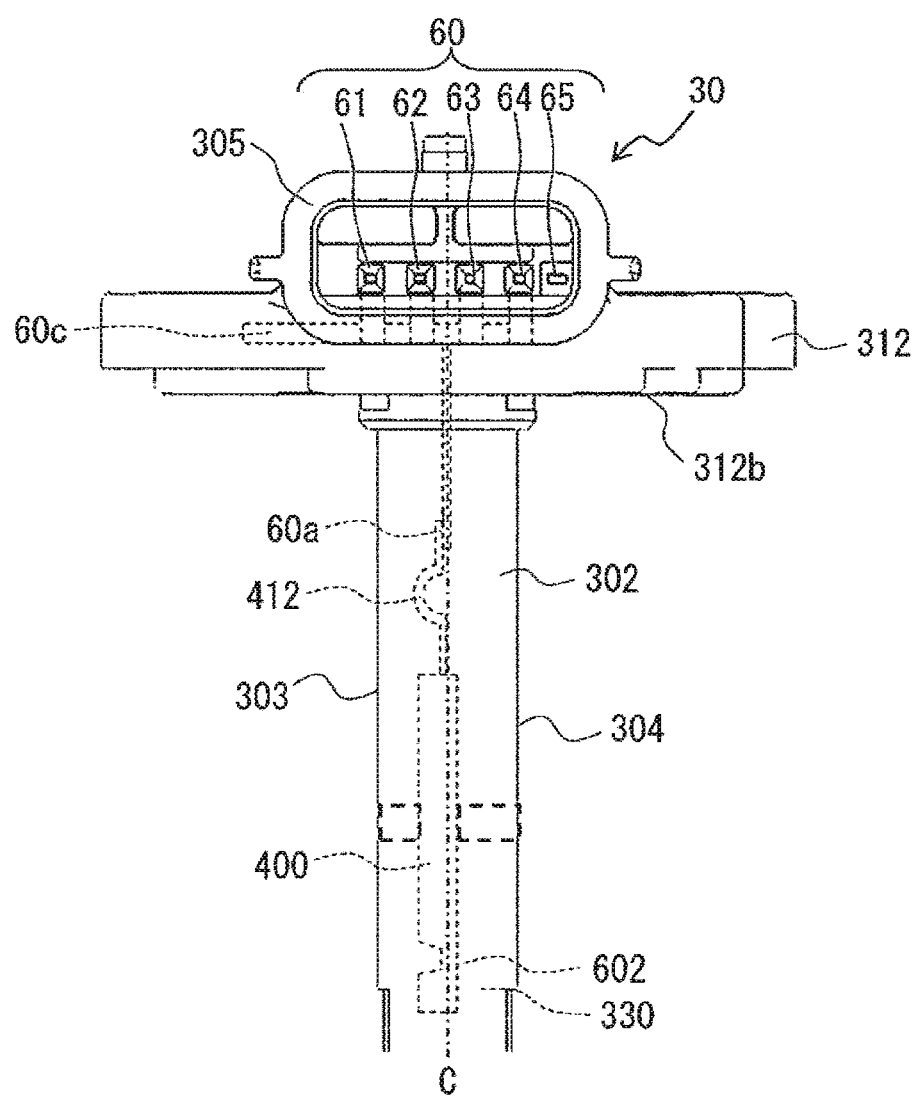
FIG. 7 is a partially enlarged view illustrating a connection of a connection terminal of the thermal flowmeter illustrated in FIG. 2D.
Figure 8:
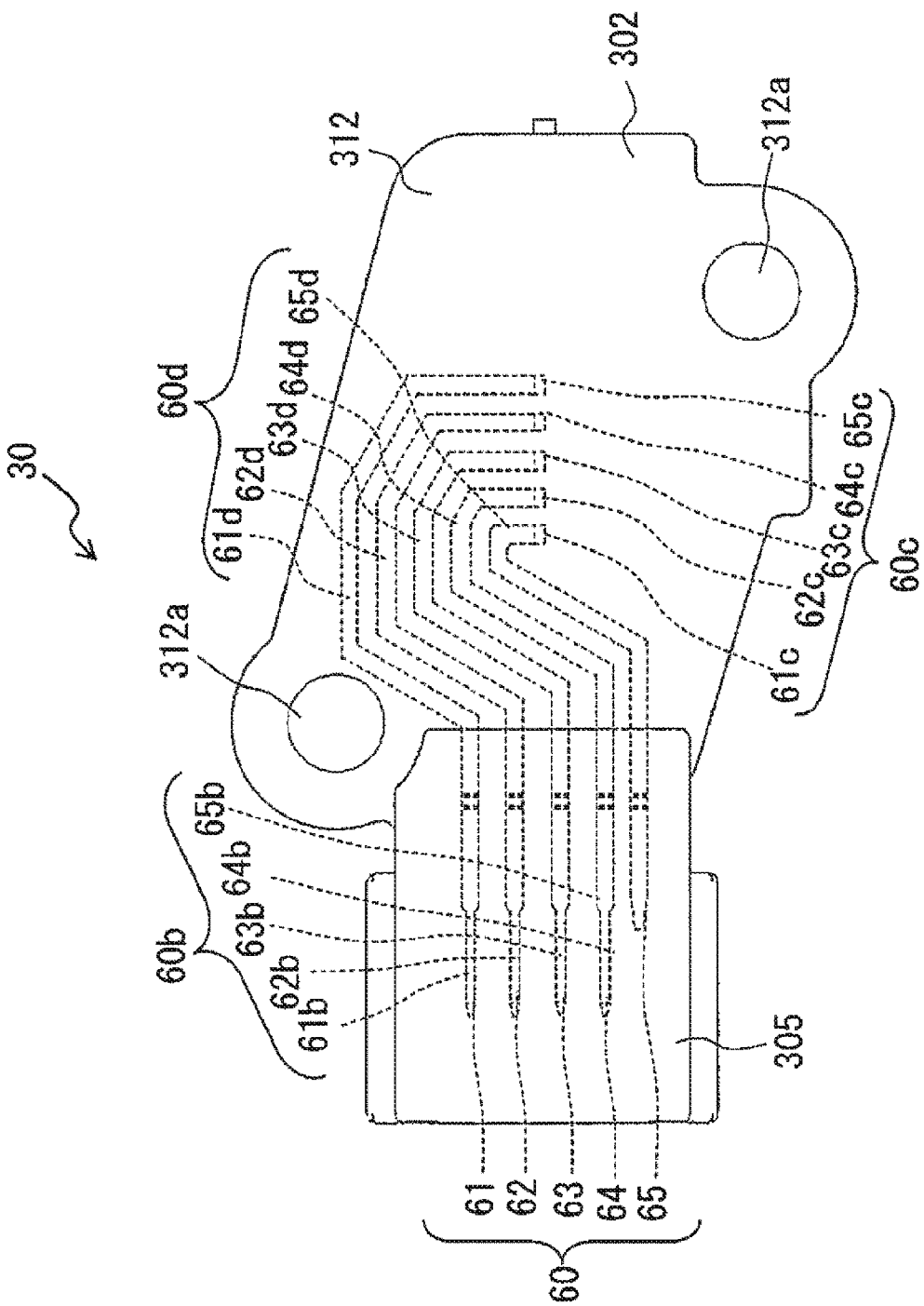
FIG. 8 is a top view illustrating an appearance of the thermal flowmeter according to the embodiment of the invention and is a diagram illustrating the connection terminal.
Figure 9:
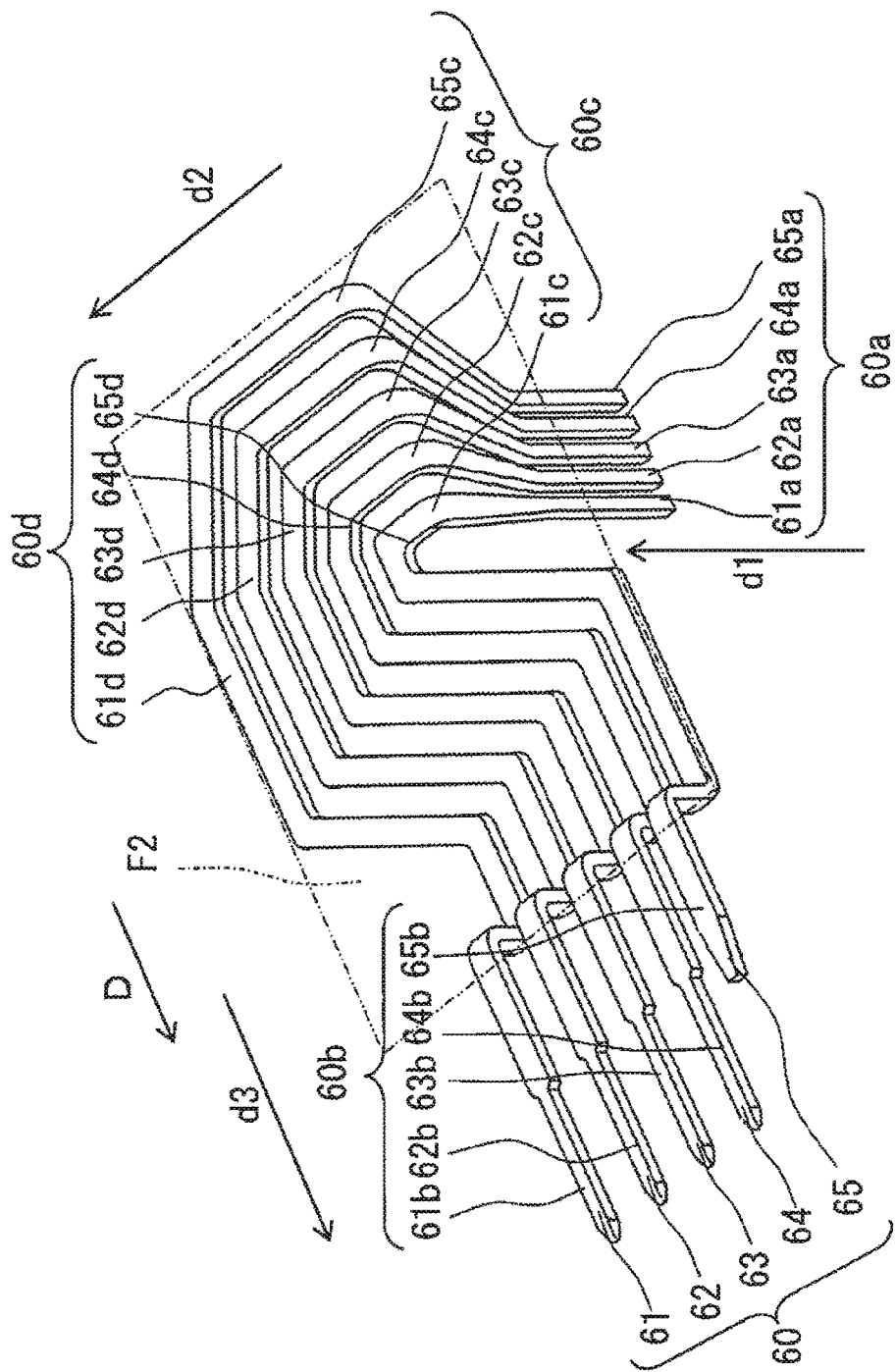
FIG. 9 is a schematic perspective view of the connection terminal of the thermal flowmeter according to the embodiment of the invention.
Figure 10:
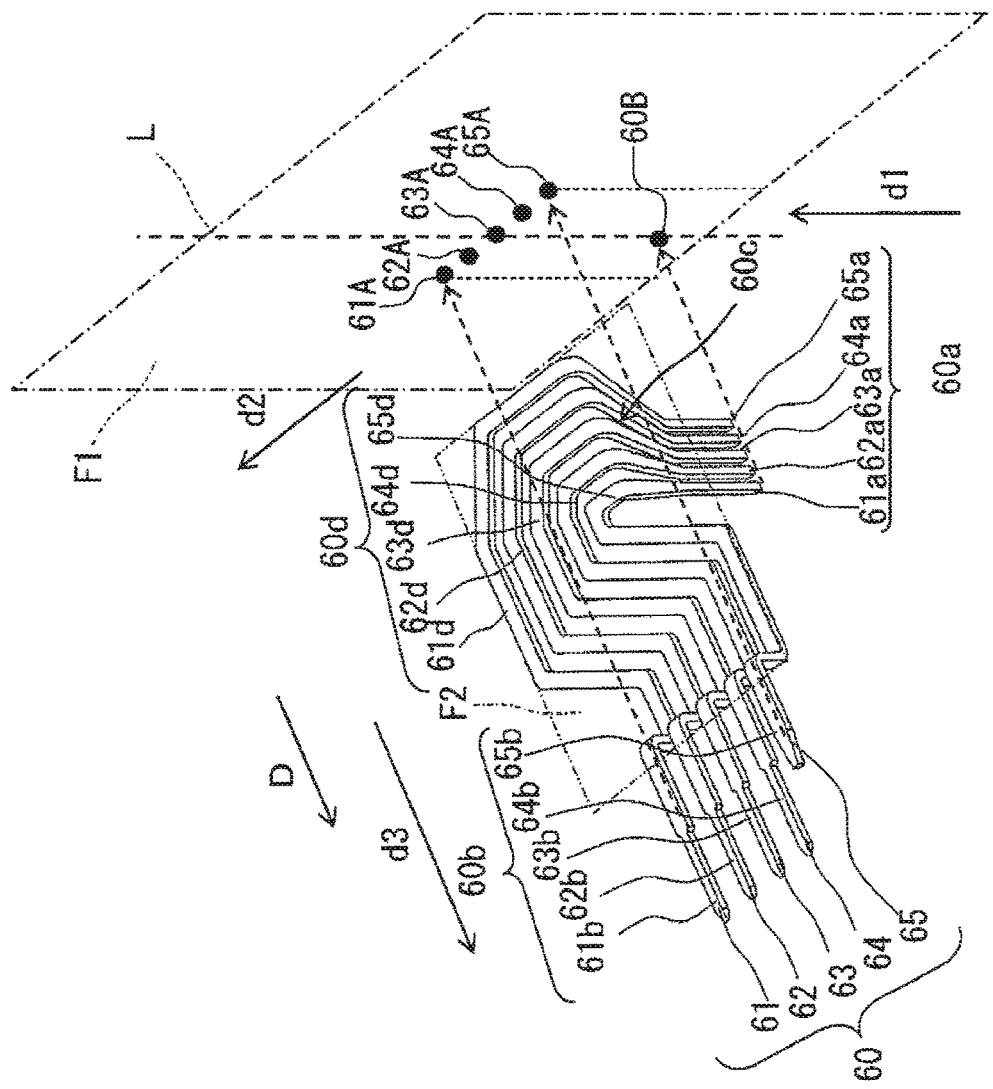
FIG. 10 is a diagram illustrating a shape of the connection terminal of the thermal flowmeter according to the embodiment of the invention.

FIG. 7 is a partially enlarged view illustrating a connection of the connection terminal of the thermal flowmeter illustrated in FIG. 2D. FIG. 8 is a top view illustrating an appearance of the thermal flowmeter according to the embodiment of the invention and is a diagram illustrating the connection terminal. FIG. 9 is a schematic perspective view of the connection terminal of the thermal flowmeter according to the embodiment of the invention. FIG. 10 is a diagram illustrating a shape of the connection terminal of the thermal flowmeter according to the embodiment of the invention.

Figure 11:
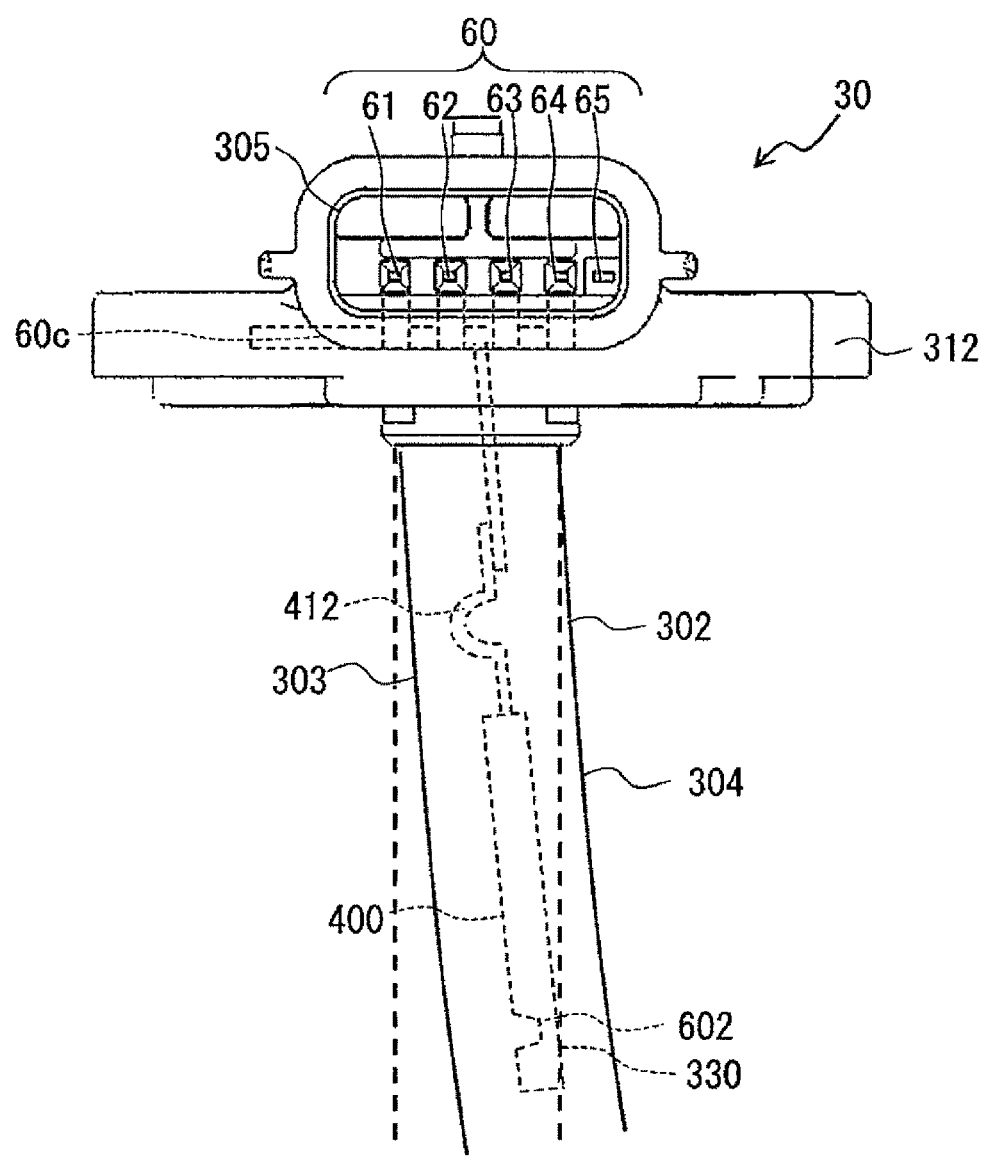
FIG. 11 is a diagram illustrating a strain when the thermal flowmeter according to the embodiment of the invention is used.

FIG. 11 is a diagram illustrating a strain when the thermal flowmeter according to the embodiment of the invention is used, FIG. 12 (*a*) is a partially enlarged right side view of a thermal flowmeter according to a comparative example, and FIG. 12(*b*) is a top view thereof.

As described above, the thermal flowmeter 30 includes the sub-passage 330 which takes a part of the measurement object gas IA flowing in the main passage 124 and the flow measurement element 602 which measures the flow amount of the measurement object gas IA flowing in the sub-passage 330 and measures the flow amount of the measurement object gas IA flowing in the main passage 124 on the basis of a measurement value measured by the flow measurement element 602.

As described above, the thermal flowmeter 30 includes the circuit package (the circuit board) 400 equipped with the flow measurement element 602, the housing 302 which forms a part of the sub-passage 330 and fixes the circuit package 400, and the plurality of connection terminals 60 each of which is electrically connected to the lead terminal (the board terminal) 412 of the circuit package 400 at one end side and is connected to the outside of the thermal flowmeter 30 at the other end side. The housing 302 is provided with the flange 312 which comes into contact with the intake pipe (the pipe) 71 forming the main passage 124 so that the thermal flowmeter 30 is attached to the intake pipe 71.

The plurality of connection terminals 60 (61 to 65) are arranged so that a predetermined gap is opened between the adjacent connection terminals 60 (61 to 65) from one end side to the other end side. The connection terminal 61 is a power terminal which supplies power to the circuit package 400 and the connection terminal 62 is an output terminal which outputs a signal of a measurement value from the thermal flowmeter 30. The connection terminal 63 is a GND terminal and the connection terminal 64 is a thermistor power terminal which supplies power to the temperature detection unit 452. The connection terminal 65 is an adjustment terminal and is electrically connected to the outside through a harness. However, the connection terminal is only used to adjust the circuit of the thermal flowmeter 30, but is not used to transmit a signal to an ECU.

As illustrated in FIG. 9, the connection terminals 61 to 65 respectively include terminal connection portions 61*a* to 65*a* (if necessary, these terminal connection portions are simply referred to as terminal connection portions 60*a*) each of which is electrically connected to each lead terminal 412 at one end side and connection pin portions 61*b* to 65*b* (if necessary, these connection pin portions are generally referred to as connection pin portions 60b) each of which is connected to the outside of the thermal flowmeter 30 at the other end side.

The connection terminals 61 to 65 respectively include first bent portions 61c to 65c (if necessary, these first bent portions are generally referred to as first bent portions 60c) each of which has a bent shape from the terminal connection portion 60a to the connection pin portion 60b and second bent portions 61d to 65d (if necessary, these second bent portions are generally referred to as second bent portions 60d) each of which has a bent shape continuous to the first bent portion 60c. The first bent portion 60c and the second bent portion 60d are disposed inside the flange 312 of the housing 302. Specifically, in the embodiment, the first bent portion 60c and the second bent portion 60d are integrally formed with each other by the second resin forming the flange 312 of the housing 302.

The first bent portion 60c has a bent shape from a first direction d1 directed from the terminal connection portion 60a toward the flange 312 to a second direction d2 (specifically, a direction orthogonal to the first direction d1) intersecting the first direction d1. The second bent portion 60d has a bent shape from the second direction d2 to a third direction d3 intersecting (orthogonal to) the first direction d1 and the second direction d2 and corresponding to the extension direction of the connection pin portion 60b in a range from the first bent portion 60c to the connection pin portion 60b.

Here, in the embodiment, as illustrated in FIG. 10, the first and second bent portions 60c and 60d are formed so that a virtual line L extending in the first direction d1 and passing through a projection area 60B of each of the terminal connection portions 60a (61a to 65a) of the plurality of connection terminals 60 (61 to 65) passes between projection areas 61A and 65A of the connection pin portions 61b and 65b located at both sides among the connection pin portions 60b (61b to 65b) of the plurality of connection terminals 60 (61 to 65) when the connection pin portions 60b of the plurality of connection terminals 60 and the terminal connection portions 60a of the plurality of connection terminals 60 are projected onto a first virtual plane F1 orthogonal to the third direction d3. Particularly, in the embodiment, the plurality of connection terminals 60 (61 to 65) are formed so that the projection areas 60B of the terminal connection portions 60a of the plurality of connection terminals 60 match one another when the terminal connection portions 60a (61a to 65a) of the plurality of connection terminals 60 (61 to 65) are projected onto the first virtual plane F1.

In this way, since the first and second bent portions 60c and 60d are formed so that the virtual line L passes between the projection areas 61A and 65A of the connection pin portions 61b and 65b located at both sides among the connection pin portions 60b (61b to 65b) of the plurality of connection terminals 60 (61 to 65), the terminal connection portions 60a (61a to 65a) and the connection pin portions 60b (61b to 65b) can be disposed in the vicinity of the center line C of the thermal flowmeter 30 in the thickness direction (see FIG. 7). Accordingly, it is possible to reduce a strain (a deformation illustrated in FIG. 11) occurring in the housing 302 due to the thermal expansion difference between the metallic connection terminal 60 (61 to 65) and the resinous housing 302 fixing the connection terminal (61 to 65) in the thermal flowmeter. Particularly, in the embodiment, since the terminal connection portion 60a (61a to 65a) of the connection terminal 60 (61 to 65) is bonded to the lead terminal (the board terminal), an influence of a deformation caused by the thermal expansion difference can be reduced due to the formation of the first and second bent portions 60c and 60d having the above-described shapes although the flow measurement element 602 of the circuit package 400 is easily influenced by the deformation.

In this way, it is possible to stabilize the detection accuracy of the flow measurement element 602 accommodated inside the housing 302. Particularly, in the embodiment, since the plurality of connection terminals 60 (61 to 65) are formed so that the projection areas 60B of the terminal connection portions 60a (61a to 65a) of the plurality of connection terminals 60 (61 to 65) match one another in the first virtual plane F1, such an effect can be further anticipated.

Here, in a thermal flowmeter 90 illustrated in a comparative example of FIGS. 12(a) and 12(b), since the second bent portion 60d is formed so that (the virtual line of) the terminal connection portion 60a is not located between the connection terminals 61 and 65 located at both sides among the connection terminals 60 (61 to 65), the connection pin portion 60b is formed at a position separated from the center line C of the thermal flowmeter 90. Accordingly, a strain easily occurs in the housing 93 due to the thermal expansion difference between the metallic connection terminal 60 (61 to 65) and the resinous housing 93 fixing the connection terminal 60 (61 to 65) in the thermal flowmeter 90 and thus a large deformation easily occurs compared to the deformation of the thermal flowmeter 30 according to the embodiment illustrated in FIG. 11. In view of such matters, for example, as illustrated in FIG. 12(a), the reinforcement metal plate 91 is disposed at the flange 312 in the thermal flowmeter 90 illustrated in the comparative example, but in the embodiment, such a metal plate 91 may not be disposed at the flange 312.

Further, in the embodiment, as illustrated in FIGS. 9 and 10, the second bent portion 60d (61d to 65d) has a bent shape along a second virtual plane F2 which is parallel to the second direction d2 and the third direction d3. Further, the second bent portion 60b is formed so that the second virtual plane F2 becomes a plane which is parallel to a flange face 312b (see FIG. 2A and the like) of the flange 312 coming into contact with the intake pipe 71 forming the main passage 124.

In this way, in the embodiment, since the second bent portion 60d can be formed in a bent shape within the same plane following the second virtual plane F2, the second bent portion 60d serves as a reinforcement metal plate within the flange 312. As a result, it is possible to suppress a deformation at the side of the first direction d1 caused by the thermal expansion difference between the flange 312 of the resinous housing 302 and the second bent portion 60d of the metallic connection terminal 60 within the second virtual plane F2.

Further, since the second bent portion 60b is formed so that the second virtual plane F2 becomes a plane which is parallel to the flange face 312b of the flange 312 coming into contact with the intake pipe 71 forming the main passage 124, the flange face 312b can be pressurized at a uniform pressure through the second bent portion 60d when the thermal flowmeter 30 is attached to the intake pipe 71 by an attachment member such as a bolt and a nut through attachment holes 312a and 312a illustrated in FIG. 8. Accordingly, since the thermal flowmeter 30 can be kept in a stable attachment state, the detection accuracy of the flow measurement element 602 can be stabilized.

Furthermore, in the embodiment, the third direction d3 matches the direction D in which the measurement object gas IA flows in the main passage 124. With such a configuration, since the connection pin portion 60b can extend along the intake pipe 71, it is possible to attach the thermal flowmeter 30 to the intake pipe 71 while saving a space. Particularly, when the first and second bent portions 60c and 60d are formed so that the center line CL of the intake pipe 71 is flush with the center lines of the connection pin portions 61b and 65b located at both sides as in the embodiment, the external connection portion (the connector) 305 can be formed along the wall face of the intake pipe 71 and thus the above-described effect can be further exhibited.

The plurality of connection terminals 60 including the first and second bent portions 60c and 60d are first processed into the shapes of the terminal connection portion 60a, the connection pin portion 60b, and the second bent portion 60d to have a continuous contact portion (not illustrated) continuous to the terminal connection portion 60a by a pressing process on a metal plate. Subsequently, a bending process is performed on the plurality of connection terminals 60 subjected to the pressing process to form the first bent portion 60c and then the continuous contact portion (not illustrated) is cut out from each of the connection terminals 61 to 65. Since such a connection terminal 60 (61 to 65) is an integrally molded member without a welded portion, the reliability of the connection terminal 60 can be improved.

While the embodiments of the invention have been described, the invention is not limited to the aforementioned embodiments and various modifications in design can be made without departing from the spirit of the invention of claims.

REFERENCE SIGNS LIST 30 thermal flowmeter
71 intake pipe (pipe)
124 main passage
302 housing
303 front cover
304 rear cover
312 flange
312b flange face
330 sub-passage
400 circuit package
412 lead terminal
602: flow measurement element
60 (61 to 65) connection terminal
60a (61a to 65a) terminal connection portion
60b (61b to 65b) connection pin portion
60c (61c to 65c) first bent portion
60d (61d to 65d) second bent portion
61A, 65A, 60B projection area
400 circuit package (circuit board)
412 lead terminal (board terminal)
d1 first direction
d2 second direction
d3 third direction
F1 first virtual plane
F2 second virtual plane
L virtual line

The invention claimed is:

1. A thermal flowmeter which includes a sub-passage taking a part of a measurement object gas flowing in a main passage and a flow measurement element measuring a flow amount of the measurement object gas flowing in the sub-passage and measures a flow amount of the measurement object gas flowing in the main passage on the basis of a measurement value obtained by the flow measurement element, the thermal flowmeter comprising: a circuit board on which the flow measurement element is mounted; a housing which forms a part of the sub-passage and fixes the circuit board; and a plurality of connection terminals which are electrically connected to a plurality of board terminals of the circuit board at one end side and are connected to an outside of the thermal flowmeter at the other end side, wherein the housing is provided with a flange which comes into contact with a pipe forming the main passage so that the thermal flowmeter is attached to the pipe, wherein the plurality of connection terminals are arranged from one end side to the other end side so that a predetermined gap is opened between the adjacent connection terminals, wherein each of the connection terminals includes a terminal connection portion which is electrically connected to each of the board terminals at one end side, a connection pin portion which is connected to the outside of the thermal flowmeter at the other end side, a first bent portion which has a bent shape from the terminal connection portion to the connection pin portion, and a second bent portion which has a bent shape continuous to the first bent portion, wherein the first bent portion and the second bent portion are disposed within the flange, wherein the first bent portion has a bent shape from a first direction directed from the terminal connection portion toward the flange to a second direction intersecting the first direction, wherein the second bent portion has a bent shape from the second direction to a third direction intersecting the first direction and the second direction and corresponding to the extension direction of the connection pin portion in a range from the first bent portion to the connection pin portion, wherein the first bent portion and the second bent portion are formed so that a virtual line extending in the first direction and passing through a projection area of each of the terminal connection portions of the plurality of connection terminals passes between the projection areas of the connection pin portions located at both sides among the connection pin portions of the plurality of connection terminals when the connection pin portions of the plurality of connection terminals and the terminal connection portions of the plurality of connection terminals are projected onto a first virtual plane orthogonal to the third direction, and wherein the third direction matches a direction in which the measurement object gas flows in the main passage.

2. The thermal flowmeter according to claim 1, wherein the second bent portion has the bent shape along a second virtual plane which is parallel to the second direction and the third direction.

3. The thermal flowmeter according to claim 2,
wherein the second bent portion is formed so that the second virtual plane becomes a plane which is parallel to a flange face of the flange coming into contact with the pipe forming the main passage.

4. The thermal flowmeter according to claim 1,
wherein the plurality of connection terminals are formed so that projection areas of the terminal connection portions of the plurality of connection terminals match one another when the terminal connection portions of the plurality of connection terminals are projected onto the first virtual plane.

5. The thermal flowmeter according to claim 1, wherein the terminal connection portion of at least one of the connection terminals is bonded to the board terminal.

6. The thermal flowmeter according to claim 1, wherein the connection terminal is an integrally molded member without a welded portion.

* * * * *